United States Patent [19]

Hefler

[11] Patent Number: 5,520,155
[45] Date of Patent: May 28, 1996

[54] TAPPET AND PLUNGER ASSEMBLY ADAPTED FOR A FLUID INJECTION PUMP

[75] Inventor: Gregory W. Hefler, Dunlap, Ill.

[73] Assignee: Caterpillar Inc., Peoria, Ill.

[21] Appl. No.: 282,136

[22] Filed: Jul. 28, 1994

[51] Int. Cl.⁶ .................................................. F07M 37/04
[52] U.S. Cl. ............................ 123/509; 417/319; 239/88
[58] Field of Search ...................... 123/508, 509, 123/90.48; 239/88–90; 417/319, 223

[56] References Cited

U.S. PATENT DOCUMENTS

| | | | |
|---|---|---|---|
| 4,378,774 | 4/1983 | Kato | 239/88 |
| 4,392,612 | 7/1983 | Deckard et al. | 239/88 |
| 4,527,738 | 7/1985 | Martin | 239/90 |
| 4,571,161 | 2/1986 | Leblanc et al. | 239/88 |
| 4,648,556 | 3/1987 | Leblanc et al. | 239/88 |
| 4,782,807 | 11/1988 | Takahashi | 123/506 |
| 5,007,584 | 4/1991 | Rossignol | 239/88 |
| 5,010,783 | 4/1991 | Sparks et al. | 74/527 |
| 5,094,215 | 3/1992 | Gustafson | 123/500 |
| 5,193,510 | 3/1993 | Straubel | 123/509 |

OTHER PUBLICATIONS

A.S.M.E Paper No. 86-ICE-18, by Sill, Jr., presented at the Energy-Sources & Tech. Conf. & Exh., New Orleans, LA, Feb. 23-27, 1986, pp. 1-8.

*Primary Examiner*—Thomas N. Moulis
*Attorney, Agent, or Firm*—Anthony N. Woloch

[57] ABSTRACT

A tappet and plunger assembly adapted for fluid injection pump, such as unit fuel injector. The fuel pump plunger is retained directly to the tappet by a flexible member such as an elastomeric o-ring. If the plunger seizes in its housing bore, the flexible member will sufficiently flex and/or fail thereby allowing the tappet to i) separate from the stationary plunger and ii) remain in contact with the mating component of the moving engine drive train. The arrangement helps prevent damage to the engine by engine drive train components if the plunger becomes seized.

15 Claims, 5 Drawing Sheets

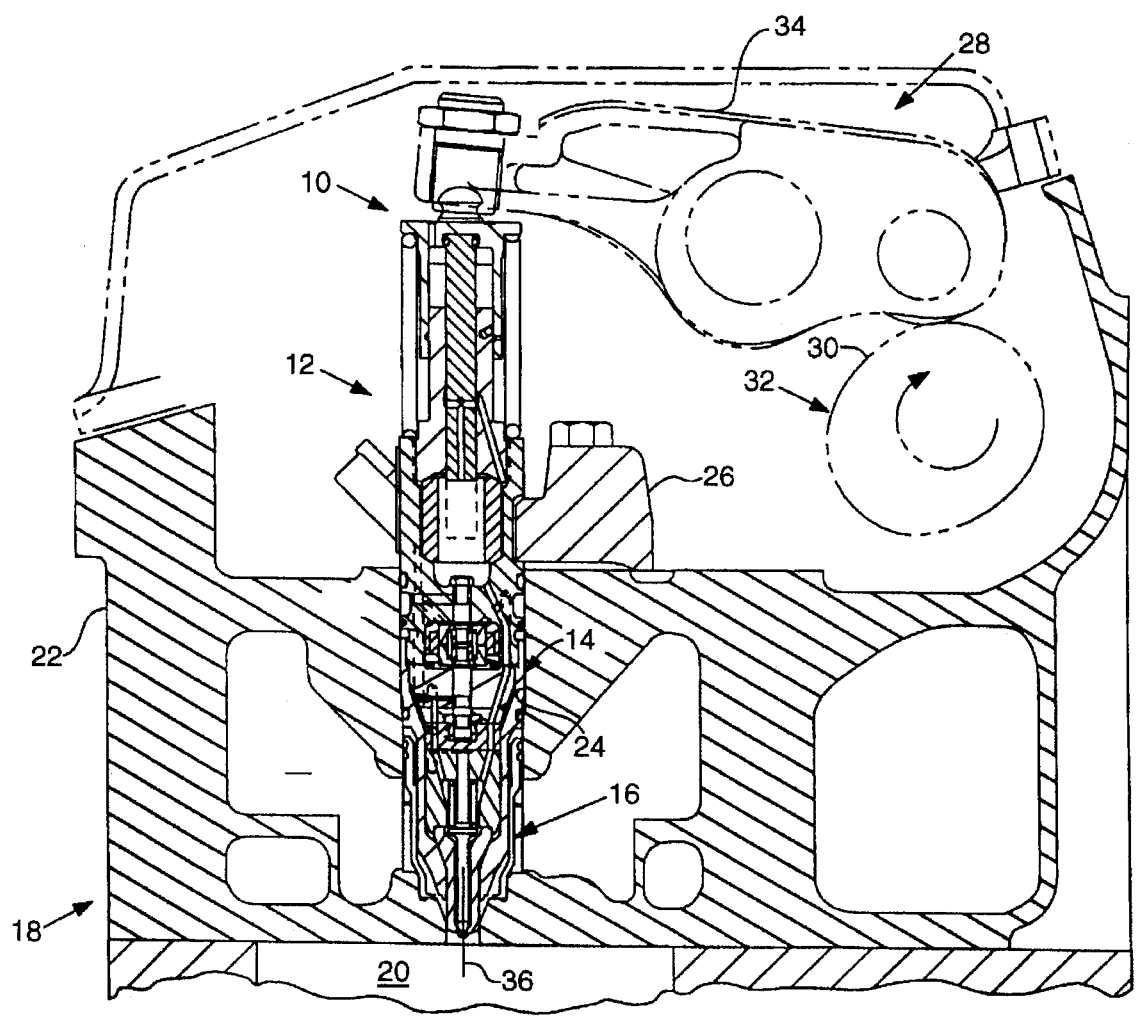
Fig_1_

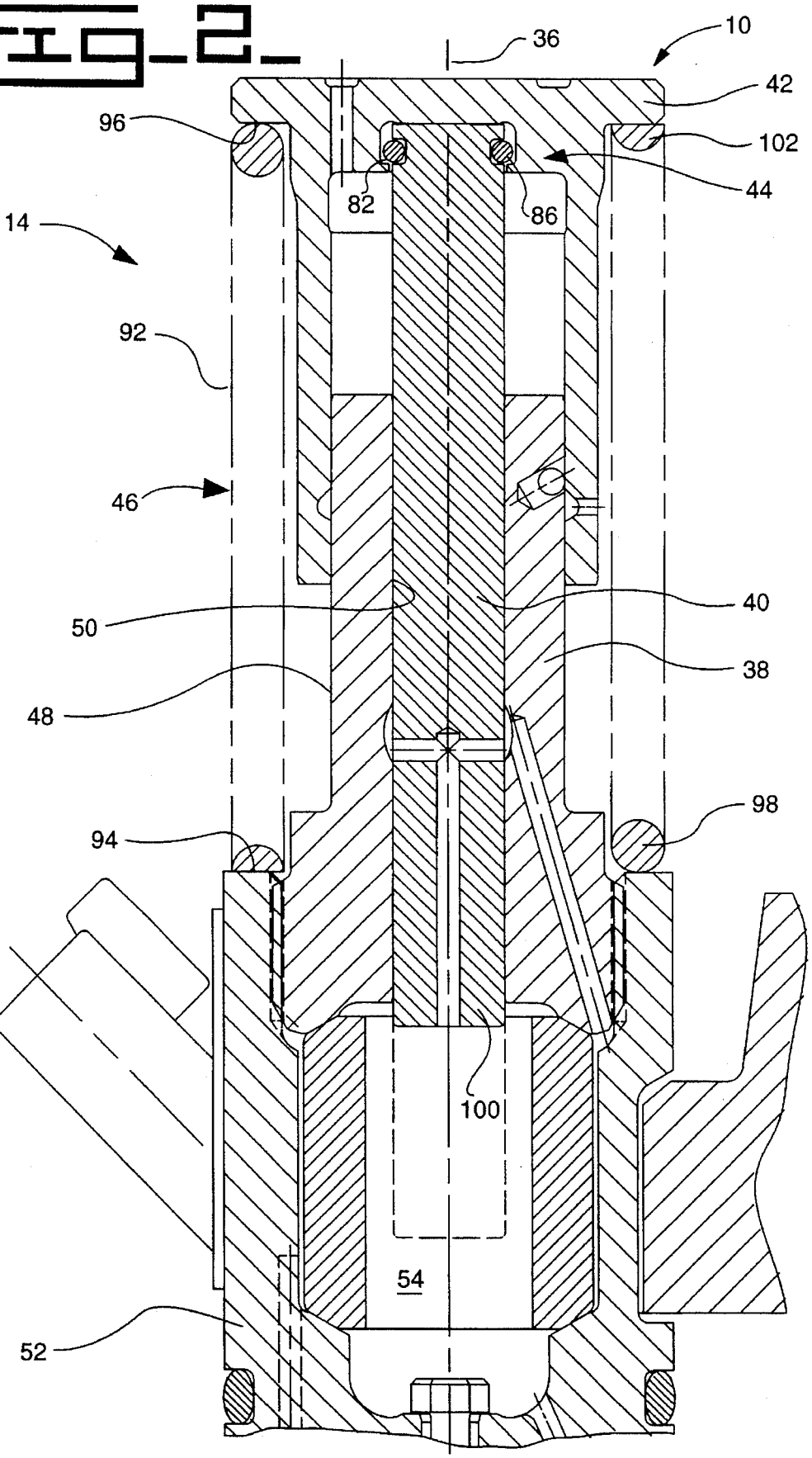
Fig_2_

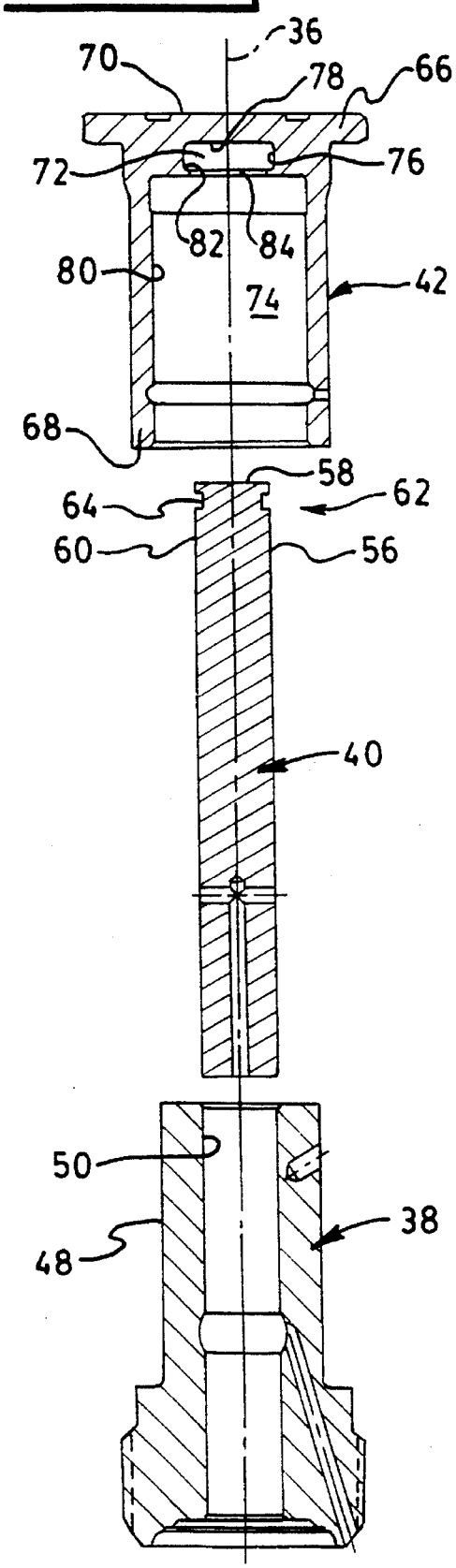
Fig_3_
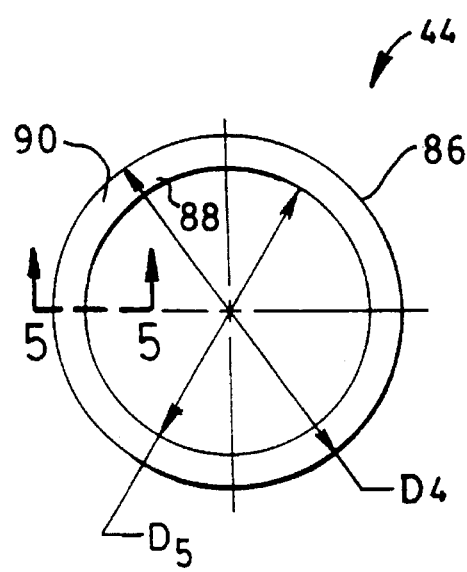
Fig_4_
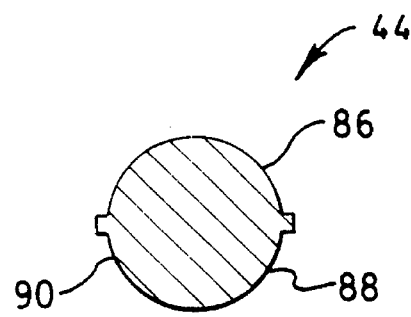
Fig_5_

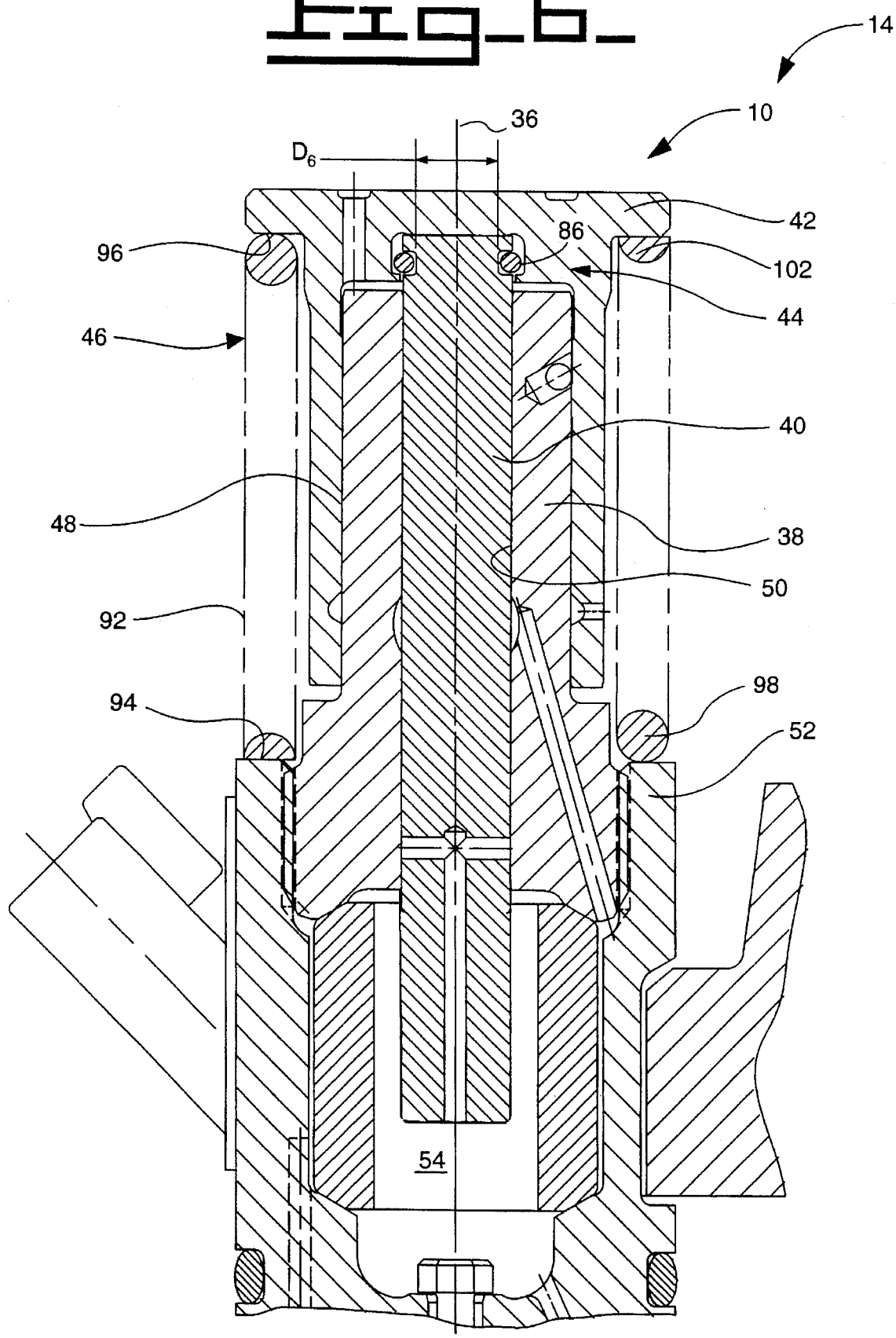
Fig_6_

TAPPET AND PLUNGER ASSEMBLY ADAPTED FOR A FLUID INJECTION PUMP

TECHNICAL FIELD

The present invention relates generally to fluid injection and, more particularly, to a tappet and plunger assembly adapted for a fluid injection pump which, for example, may be a unit fuel injector.

BACKGROUND ART

Examples of known mechanically-actuated (i.e., mechanically-driven) fuel injection pumps are shown in U.S. Pat. No. 4,392,612 issued on Jul. 12, 1983 to Deckard et al. and U.S. Pat. No. 4,782,807 issued on Nov. 8, 1988 to Takahashi. Such fuel injection pumps typically include a reciprocal tappet having a bifurcated or forked end portion clasped around a flanged end portion of a fuel pump plunger. An engine drive train (typically including a camshaft, a rocker arm, and perhaps a pushrod) periodically drives the tappet and plunger assembly in a reciprocating motion between a retracted position and a fully-stroked position.

A potentially catastrophic problem may occur with this arrangement if the plunger accidentally becomes seized in its housing bore (which is most likely to occur when the plunger is at or near its fully-stroked position which generates the highest fluid pressure). If the plunger becomes seized, the moving components of the engine drive train will separate from the tappet whose reciprocating motion is immediately stopped or restrained by the seized plunger. Separation of the engine drive train from the tappet can cause catastrophic damage to the engine by misaligned engine drive train components, such as push rods, which become separated from the tappet or other mating components of the engine drive train.

The present invention is directed to overcoming one or more of the problems as set forth above.

DISCLOSURE OF THE INVENTION

In one aspect of the present invention, there is disclosed an improved tappet and plunger assembly adapted for a fluid injection pump. The tappet and plunger assembly includes a movable tappet having a tappet drive surface, a movable fluid pump plunger having a plunger drive surface; and a retainer releasably connected between the plunger and the tappet. The plunger drive surface normally abuts and remains in contact with the tappet drive surface during combined movement of the tappet and plunger. The releasable retainer is capable of releasing the tappet from the plunger if the position of the plunger becomes fixed.

In another aspect of the present invention, there is disclosed an improved fuel injection pump adapted for an internal combustion engine. The fuel injection pump comprises a housing defining an internal housing bore, a movable plunger positioned in the housing bore, a movable tappet, and a retainer releasably connected between the plunger and the tappet. The plunger and tappet each have a drive surface normally abutting one another so that substantially no driving force acts on the releasable retainer during combined movement of the tappet and plunger. The releasable retainer is capable of releasing the tappet from the plunger if the position of the plunger becomes fixed.

If the plunger becomes seized in its housing bore, the releasable retainer releases its connection between the tappet thereby enabling the tappet to continue its motion and remain in contact with its mating engine drive train components. The above arrangement thereby avoids or limits catastrophic failure of the engine caused by a plunger seizure.

BRIEF DESCRIPTION OF THE DRAWINGS

FIG. 1 is a diagrammatic partial cross-sectional view of one embodiment of an injector of the present invention as installed in an exemplary internal combustion engine;

FIG. 2 is a diagrammatic enlarged cross-sectional partial view of one end portion of the injector, shown in FIG. 1, showing a tappet and plunger assembly at a first or retracted position;

FIG. 3 is a diagrammatic reduced exploded cross-sectional view of the tappet, plunger, and barrel of the injector shown in FIG. 1;

FIG. 4 is a diagrammatic enlarged view of a releasable retainer of the tappet and plunger assembly shown in FIG. 1;

FIG. 5 is a diagrammatic enlarged cross-sectional view of the releasable retainer taken generally along line 5—5 of FIG. 4;

FIG. 6 is a view similar to FIG. 2 but showing the tappet and plunger assembly at a second or fully-stroked position;

BEST MODE FOR CARRYING OUT THE INVENTION

Figure 7:
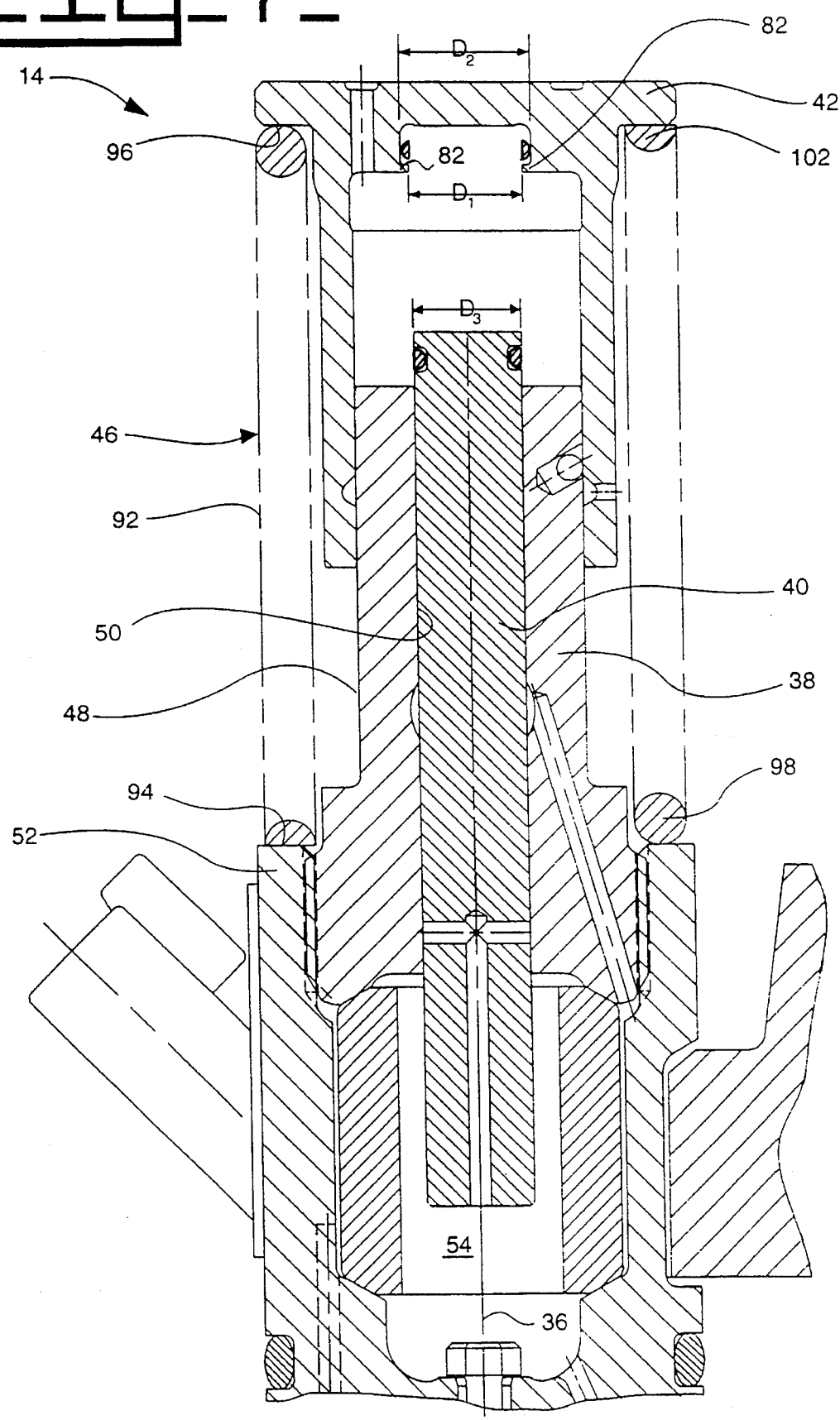
FIG. 7 is a view similar to FIG. 2 but showing the plunger seized in the barrel and the tappet separated or released from the plunger.

Referring to FIGS. 1–7, wherein similar reference numerals designate similar elements or features throughout the Figs., there is shown an embodiment of a tappet and plunger assembly 10 adapted for a fluid pressurization device 12 which, for example, may be a fluid injection pump. In the embodiment shown, each fluid pressurization device 12 is incorporated in a respective unit fluid injector 14 wherein both the fluid pressurization device 12 and a fluid injection device or injection nozzle 16 are housed in the same unit. Although shown and described here as part of a unitized injector 14, alternatively, the fluid pressurization device 12 and the fluid injection device 16 could be of a modular construction wherein the fluid pressurization device is positioned separate or remote from the fluid injection device 16 but arranged in fluid communication therewith by a fluid line or passage (not shown).

The exemplary fluid pressurization device 12 is shown in FIG. 1 as adapted for a direct-injection diesel-cycle reciprocating internal combustion engine 18. However, it should be understood that the present invention is also applicable to other types of engines, such as rotary engines or modified-cycle engines, and that the engine may contain one or more engine combustion chambers or cylinders 20. The engine 18 has at least one cylinder head 22 wherein each cylinder head 22 defines one or more separate injector bores 24. The engine 18 includes at least one and preferably a plurality of injectors 14, each adapted to be positioned in a respective injector bore 24 and secured therein by an injector clamp 26 connected to the cylinder head 22.

The engine also includes an actuating means 28 for actuating the fluid pressurization device 12. The actuating means 28 may be any mechanically-actuating device, or hydraulically-actuating device, or hydromechanically-actuating device. In the embodiment shown, the tappet and plunger assembly 10 associated with the injector 14 is mechanically actuated indirectly or directly by a rotatable cam or cam lobe 30 mounted on or integral with a rotatable engine-driven camshaft 32. In the embodiment shown, the cam 30 drives a rocker arm assembly 34 which in turn reciprocates a tappet associated with the fluid pressurization device 12 or injector 14. The tappet is described in greater detail below. Alternatively, a pushrod (not shown) may be positioned between the cam 30 and the rocker arm assembly 34. Alternatively, a pushrod (not shown) may be positioned between the rocker arm assembly 34 and the tappet.

The fluid used in the fluid pressurization device may, for example, be fuel. For reference purposes herein, the fluid pressurization device 12 of the injector 14 includes an imaginary longitudinal centerline axis 36. The fluid pressurization device 12 preferably includes a housing or barrel 38, a reciprocal fluid pump plunger 40, a reciprocal tappet 42, a releasable retainer 44 or releasable retaining means for releasably retaining the tappet 42 to the plunger 40 during assembly of the injector 14, and biasing means 46 for biasing the tappet 42 towards a first or retracted position away from the housing 38.

Referring to FIG. 3, the housing 38 defines an outer cylindrical guide surface 48 and an internal housing bore 50. The housing 38 is connected to or integral with another housing or body 52 which helps define a fluid pumping chamber 54.

The plunger 40 is positioned in the housing bore 50 for reciprocal movement. The plunger 40 has an end portion 56 defining a plunger drive surface 58, an outer circumferential surface 60, and a mortise or cavity 62 intersecting the outer circumferential surface. Preferably, the mortise is a circumferential annular groove 64 axially spaced from the plunger drive surface. Alternatively, the mortise 62 may have some other shape, such as a hole or slot, into which the releasable retainer fits. Preferably for high fuel pressure applications, the plunger 40 is made from a hardened steel and the plunger drive surface 58 is semi-spherically shaped.

The tappet 42 has a first end portion 66 and a second end portion 68. The tappet first end portion 66 defines a first drive surface 70 adapted to be driven by an engine drive train component such as the rocker arm assembly 34. The tappet second end portion 68 has annular first and second internal annular walls 72,74. The first internal wall 72 defines a blind bore 76 arranged co-axial with the axis 36 and a second drive surface 78. Preferably, the first and second drive surfaces 70,78 of the tappet 42 are relatively flat or planar. The second internal wall 74 defines a counterbore 80 arranged co-axial with the blind bore 76. The second internal wall 74 of the tappet 42 is slidably positioned around the guide surface 48 of the housing 38. The first and second internal walls 72,74 of the tappet 42 define an internal annular shoulder or lip 82 and an aperture 84, both of which are positioned axially between the first and second internal walls 72,74. The aperture 84 has an aperture diameter $D_1$ smaller in magnitude that the diameter $D_2$ of the tappet blind bore 76. The aperture diameter $D_1$ is also larger than the outer diameter $D_3$ of the end portion 56 of the plunger 40. Preferably for high fuel pressure applications, the tappet 42 is made from a hardened steel.

The tappet 42, plunger 40, and releasable retaining means 44 are normally reciprocally movable together between the first or retracted position shown in FIG. 2 and a second or fully-stroked position shown in FIG. 6. The plunger drive surface 58 normally abuts the second drive surface 78 of the tappet 42 during combined movement of the tappet 42 and plunger 40. With the above arrangement, substantially no driving force is transmitted to the releasable retaining means 44 during combined reciprocal movement of the tappet 42 and plunger 40. In other words, all or substantially all of the driving force transmitted between the tappet 42 and the plunger 40 is transmitted through the driving surfaces 58,78 during combined reciprocal movement of the tappet 42 and plunger 40.

Preferably, the releasable retaining means 44 includes an flexible member 86. Preferably, the flexible member 86 has an annular shape having a solid cross-sectional area although other configurations may be used. Referring to FIGS. 4–5, the flexible member 6 has a radially-inward first end portion 88 and a radially-outward second end portion 90. The first end portion 88 of the retainer 44 engages the plunger mortise 62 such as the plunger annular groove 64. The second end portion 90 of the retainer 44 engages or is confined by the internal annular shoulder 82 of the tappet 42. Preferably, the annular flexible member 86 has an outside diameter $D_4$, in its uncompressed natural state, larger than the diameter of the aperture. Preferably, the annular flexible member 86 has an inside diameter $D_5$, in its unstretched or natural state, smaller than the inside diameter $D_6$ of the annular groove 64 of the plunger 40. For example, the annular flexible member 86 may be or include an elastomeric o-ring as shown in FIGS. 4–5. The material for the o-ring may be a fluorocarbon rubber (FKM) having the following properties:

| | |
|---|---|
| hardness (durometer "A") | 75 ± 5 |
| tensile strength | 8.3 MPa min |
| elongation | |
| (<6.8 mm x-section) | 125% min |
| (≧6.8 mm x-section) | 100% min |
| extension modulus at 100% elongation | 4.8 MPa min |

Alternatively, the flexible member 86 may be or include a split retaining ring. Alternatively, the material for the flexible member 86 may be plastic or metallic. The flexible member 86 has a selected strength less than a selected strength of each of the tappet and plunger. The selected strength may be at least one of tensile, shear, or deformation (modulus) strength. If the selected strength of the flexible member 86 is exceeded by an effective force acting on the flexible member, the flexible member is intended to flex and/or fail sufficiently to thereby release the tappet 42 from the plunger 40.

Preferably, the biasing means 46 includes a helical compression spring 92 positioned between an external annular shoulder 94 of the housing 52 and an annular shoulder 96 of the tappet 42. The return spring 92 has a selected spring constant k capable of generating an effective axial force greater than the selected strength of the flexible member 86.

INDUSTRIAL APPLICABILITY

Preferably, the method of assembling the tappet and plunger assembly 10 is accomplished by orienting and installing those components in a generally vertical position in order to take advantage of the effects of gravity. It is noted that other components of the injector 14 may be advantageously installed while the housing 52 is in this vertical position. Moreover, although for purposes of clarity, the assembly steps are described below in a sequence, alternatively, some of the assembly steps may be effected simultaneously or in a different sequence without departing from the invention.

Referring to FIG. 2, an initial step is connecting the housing 38 to the housing 52, preferably by a threaded connection. Another step is positioning one end portion 98 of the spring 92 on top of the annular shoulder 94 of the housing 52. The flexible member 86 is partially but snugly installed in the annular groove 64 of the plunger 40. The end portion 56 of the plunger 40 is then inserted into the counterbore 80 and through the aperture 84 of the tappet 42 and into the blind bore 76 until the plunger drive surface 58 directly contacts the second drive surface 78 of the tappet 42. As the end portion 56 of the plunger 40 passes through the aperture 84, the flexible member 86 is compressed by the internal annular shoulder 82 of the tappet 42. After the flexible member 86 passes by the internal annular shoulder 82, the flexible member 86 expands to its uncompressed natural state and thereby becomes confined or trapped in the blind bore 76 by the internal annular shoulder 82.

The next step is inserting an opposite end portion 100 of the plunger 40 into the housing bore 50 according to a relatively tight annular clearance until the external annular shoulder 96 of the tappet 42 contacts another opposite end portion 102 of the spring 92. After assembly and bench testing of the injector 14 is completed, the injector 14 is installed in the injector bore 24 of the engine 18.

After assembly of the injector 14 and prior to engine startup, the flexible member 86 holds the plunger 40 onto the tappet 42 so that the axial position of the plunger 40 is maintained upwardly as shown (by the solid outline of the plunger) in FIG. 2. This enables any air contained in the storage chamber 54 to be purged through the axial and radial passages defined in the plunger 40. At this axial position of the plunger 40 and a selected initial portion of plunger stroke or displacement, the plunger passages temporarily communicate with an annulus and at least one drain passage defined in the housing 38. After the plunger has moved downwardly past its selected initial portion of plunger stroke, the plunger passages no longer communicate with the annulus and drain passage(s) defined in the housing 38 so that the remaining fuel in the storage chamber 54 can be pressurized. This arrangement enables the storage chamber 54 to be rapidly primed with fuel in order to improve startability of the engine. This arrangement also helps minimize the magnitude of the fuel priming pressure required to start the engine.

During operation, the engine drive train (30,32,34) and return spring 92 collectively periodically reciprocate the tappet and plunger assembly 10 between its first or retracted position shown in FIG. 2 and its second or fully-stroked position shown in FIG. 6. Fluid pressure in the fluid pumping chamber 54 normally maintains contact between the drive surfaces 58,78 of the tappet 42 and plunger 40. Zero or substantially zero driving force is transmitted to the flexible member 86 while the tappet 42 and plunger 40 reciprocate together.

If the plunger 40 accidentally becomes seized in the housing bore 50, the return spring 92 will eventually exert an effective force on the flexible member 86 to cause either sufficient flexing or failure thereof for releasing the tappet 42 from the stationary plunger 40. The return spring 92 maintains driving contact between the tappet 42 and the mating component of the engine drive train so that proper alignment of all the moving engine drive train components is maintained. Thus, none of the moving drive train components are permitted to damage the engine if a plunger seizure occurs.

Other aspects, objects, and advantages of this invention can be obtained from a study of the drawings, the disclosure, and the appended claims.

I claim:

1. A tappet and plunger assembly adapted for a fluid injection pump comprising:
   a movable tappet having a tappet drive surface;
   a movable fluid pump plunger having a plunger drive surface; and
   a releasable retainer connected between the plunger and the tappet, said tappet, plunger, and releasable retainer normally reciprocally movable together between a first position and a second position, said plunger drive surface normally abutting the tappet drive surface during combined movement of the tappet and plunger, said releasable retainer having a selected strength which if exceeded by an effective force acting on the retainer permits separation of the tappet from the plunger if the position of the plunger becomes fixed.

2. The tappet and plunger assembly of claim 1 wherein said releasable retainer includes a flexible member having a radially-inward first end portion and a radially-outward second end portion, said first end portion of the retainer engaging the plunger and said second end portion of the retainer engaging the tappet.

3. The tappet and plunger assembly of claim 2 wherein said flexible member is an elastomeric member.

4. The tappet and plunger assembly of claim 3 wherein said elastomeric member is an o-ring.

5. The tappet and plunger assembly of claim 2 wherein said flexible member is a split retaining ring having a selected strength less than that of the tappet and plunger.

6. The tappet and plunger assembly of claim 1 wherein said plunger and tappet collectively define an annular groove, said releasable retainer including an annular flexible member having a radially-inward first end portion and a radially-outward second end portion, said first portion of the member engaging a portion of the annular groove defined by the plunger, said second portion of the member engaging a portion of the annular groove defined by the tappet.

7. The tappet and plunger assembly of claim 6 wherein said flexible member is an elastomeric o-ring.

8. The tappet and plunger assembly of claim 1 wherein said fluid injection pump is a unit fluid injector.

9. The tappet and plunger assembly of claim 1 wherein said fluid injection pump is a unit fuel injector.

10. A fuel injection pump adapted for an internal combustion engine comprising:
    a housing defining an outer cylindrical guide surface and an internal housing bore;
    a reciprocal plunger positioned in the housing bore and having an end portion defining a plunger drive surface;
    a reciprocal tappet having first and second end portions, said tappet first end portion defining a first drive surface adapted to be driven by the engine, said tappet second end portion having annular first and second internal walls, said first internal wall defining a blind bore and a second drive surface, said second internal wall defining a counterbore axially aligned with the blind bore, said second internal wall of the tappet slidably positioned around the guide surface of the housing;
    releasable retaining means for releasably retaining the plunger to the tappet, said tappet, plunger, and releasable retaining means normally reciprocally movable together between a first position and a second position, said plunger drive surface normally abutting the second drive surface of the tappet so that substantially no driving force acts on the releasable retaining means during combined movement of the tappet and plunger; and biasing means for biasing the tappet towards the first position, said biasing means positioned between the housing and the tappet.

11. The fuel injection pump of claim 10 wherein said releasable retaining means includes an elastomeric member connected between the plunger and the tappet.

12. A unit fuel injector adapted for an internal combustion engine comprising:

a housing defining an outer cylindrical guide surface and an internal housing bore;

a reciprocal plunger positioned in the housing bore and having an end portion defining a plunger drive surface and an circumferential annular groove spaced from the plunger drive surface;

a reciprocal tappet having first and second end portions, said tappet first end portion defining a first drive surface adapted to be driven by the engine, said tappet second end portion having annular first and second internal walls, said first internal wall defining a blind bore and a second drive surface, said second internal wall defining a counterbore axially aligned with the blind bore, said second internal wall of the tappet slidably positioned around the guide surface of the housing, said first and second internal walls defining an internal annular shoulder and an aperture smaller in diameter than the tappet blind bore;

releasable retaining means for releasably retaining the plunger to the tappet, said tappet, plunger, and releasable retaining means normally reciprocally movable together between a first and second positions, said plunger drive surface normally abutting the second drive surface of the tappet during combined movement thereof so that substantially no driving force is transmitted to the releasable retaining means during combined movement of the tappet and plunger, said releasable retaining means including an annular elastomeric member positioned in the plunger annular groove and confined within the internal annular shoulder of the tappet; and biasing means for biasing the tappet towards the first position, said biasing means positioned between the housing and the tappet.

13. The unit fuel injector of claim 12 wherein said internal annular shoulder of the tappet defines an aperture having a diameter smaller than that of the tappet blind bore, said annular elastomeric member having an outside diameter larger than that of said aperture.

14. The unit fuel injector of claim 13 wherein said annular elastomeric member has a selected strength, said biasing means including a helical compression spring having a spring constant capable of generating a force greater than said strength of the annular elastomeric member to thereby release the tappet from the plunger if the position of the plunger becomes fixed.

15. The unit fuel injector of claim 14 wherein said selected strength is at least one of tensile, shear, and deformation strength.

* * * * *